J. C. ALLAN.
Insecticides.
No. 206,209.    Patented July 23, 1878.
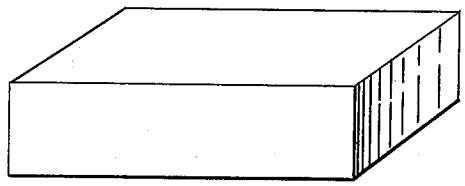
Witnesses.
Inventor.
John C. Allan
Per, James Sangster
Atty.

UNITED STATES PATENT OFFICE

JOHN C. ALLAN, OF BUFFALO, NEW YORK.

IMPROVEMENT IN INSECTICIDES.

Specification forming part of Letters Patent No. 206,209, dated July 23, 1878; application filed February 6, 1878.

*To all whom it may concern:*

Be it known that I, JOHN C. ALLAN, of Buffalo, Erie county, New York, have invented an Improved Composition for Making Cakes of Fly-Poison, of which the following is a specification:

The object of this invention is a composition which may be readily molded into blocks or cakes, capable of being pulverized by scraping and containing matter which will attract and destroy the insects.

The composition consists of glucose, three parts; arsenic, one part; clay, fifteen parts. These are intimately mixed with sufficient water to form a stiff paste, which is then molded into a block, as shown in the drawing.

The glucose serves to cement the particles of clay together and prevent the clay from cracking.

A block is used by scraping off a portion of the same and placing it in water, which soon becomes impregnated both with poison and sugar, so as to attract as well as destroy the insects.

It will be apparent that the proportion of these ingredients may be modified.

I claim—

The within-described composition for fly-blocks, consisting of arsenic, glucose, and clay, as set forth.

JOHN C. ALLAN.

Witnesses:
 JAMES SANGSTER,
 F. P. STIKER.